Feb. 5, 1957     S. PRIFTIS     2,780,745
ROTATABLE INDUCTIVE ELECTRO-MECHANICAL APPARATUS
Filed July 1, 1955     2 Sheets-Sheet 1

INVENTOR.
SIDAIRE PRIFTIS
BY
*Tyler & Roundy*
ATTORNEY

Feb. 5, 1957 S. PRIFTIS 2,780,745
ROTATABLE INDUCTIVE ELECTRO-MECHANICAL APPARATUS
Filed July 1, 1955 2 Sheets-Sheet 2

INVENTOR.
SIDAIRE PRIFTIS
BY
ATTORNEY

United States Patent Office 2,780,745
Patented Feb. 5, 1957

2,780,745

ROTATABLE INDUCTIVE ELECTRO-MECHANICAL APPARATUS

Sidaire Priftis, Ridgefield, N. J., assignor to Bendix Aviation Corporation, Teterboro, N. J., a corporation of Delaware Application July 1, 1955, Serial No. 519,400

5 Claims. (Cl. 310—258)

This invention relates to rotatable inductive electromechanical apparatus and particularly to means for controlling and locking the axial-play allowed the rotor shaft of rotatable transformer devices such as inductive synchro-devices, resolvers, linear-output type rotatable transformers and of servomotors and the like.

Heretofore, it has generally been found necessary to make some provision for controlling the amount of axial-play or end-play which the rotor shaft of a rotatable inductive device is permitted to have. A limited amount of axial-play usually must be permitted so as to accommodate axial expansion caused by temperature changes. However, excessive axial-play in the rotor shaft of a transmitter synchro device or servoed follow-up synchro device results in misalignment of the rotor and stator cores and their windings so as to cause spurious output signals. Similarly, excessive axial-play of the rotor shaft of a self-synchronous follow-up synchro device or of a servomotor results in erratic angular positions for the rotor. Practical manufacturing tolerances usually require some means for adjusting axial-play of a rotor shaft after assembly. Prior attempts to adjust axial-play of rotor shafts have usually involved the use of a selected number of axially spaced annular shims or spacers or the use of a rotatable end member cooperating with an axially deformable detent element staked permanently into a slot especially cut into an end plate. The use of shims does not facilitate small adjustments, and it has been found that deformable detent elements break off or loosen from the end plate after being manipulated only a few times thereby losing control of the end-play adjustment.

It is an object of the present invention to provide improved rotatable inductive apparatus.

It is another object of the invention to provide novel compact and inexpensive means for controlling the axial-play or end-play in a rotatable inductive device.

It is another object of the invention to provide novel means for locking an axial-play adjustment in a rotatable inductive device.

It is another object of the invention to provide novel removable means for locking an axial-play adjustment in a rotatable inductive device.

It is another object of the invention to provide, in a rotatable inductive device employing a rotatable end member or ring for controlling the axial position of an end housing plate, novel means for preventing unwanted variations in the axial position of the end housing plate which would otherwise cause a departure from the amount of axial-play or end-play permissible.

It is another object of the invention to provide a novel split-ring device.

The foregoing and other objects and advantages of the present invention will appear more fully hereinafter from a consideration of the detailed description which follows, taken together with the accompanying drawings wherein certain forms of the invention are illustrated by way of example. It is to be expressly understood, however, that the drawings are for illustration purposes only and are not to be construed as defining the limits of the invention.

In the drawings wherein like reference numerals refer to like parts,

Figure 1:
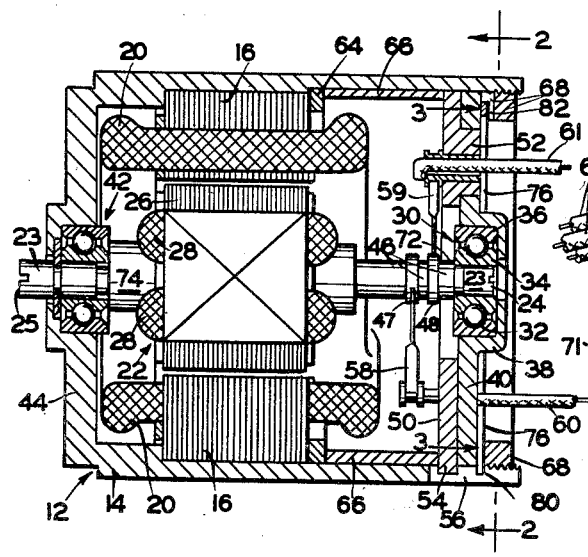
Fig. 1 illustrates a cross-sectional side elevation view of a rotatable transformer device employing brushes and slip rings and provided with means for controlling axial-play in accordance with the present invention.

The rotatable transformer device of Fig. 1 may be an inductive synchro device having windings distributed as disclosed and claimed in U. S. Patent 2,488,771 to J. P. Glass and U. S. Patent 2,550,663 to P. F. Bechberger and P. G. Yeannakis, or may be an inductive resolver such as disclosed and claimed in U. S. Patent 2,660,681 to E. Horne or may be a linear-output type rotatable transformer such as disclosed and claimed in the copending application of S. C. Lapidge and P. G. Yeannakis, Ser. No. 435,482, filed June 9, 1954 and the co-pending application of S. C. Lapidge, Ser. No. 435,946, filed June 10, 1954, the aforesaid patents and applications being assigned to the same assignee as the present application.

Figure 2:
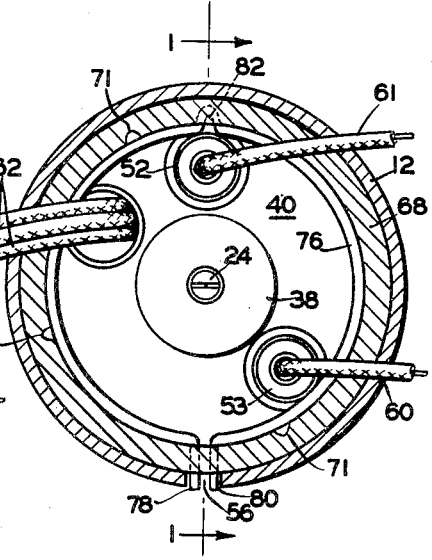
Fig. 2 is a cross-sectional end view of the device of Fig. 1 taken along the line 2—2.

Turning to Figs. 1 and 2, the rotatable transformer device is indicated generally at 12 and includes an open-ended cylindrical metal housing 14 in which is embedded and cemented a generally cylindrical laminated stator core 16 of magnetically permeable material such as iron. The various coils of the secondary winding or windings 20 are located in peripheral slots provided in the stator core 16.

A rotor 22, which is illustrated as being of the salient pole type, is rotatably mounted on a shaft 23 and includes a laminated core 26 of magnetically permeable material such as iron on which are wound the turns of a primary winding 28 in inductive coupling relation with the stator secondary winding 20. Shaft 23 is supported at one end 24 by a ball bearing assembly 30 including ball bearings 32 and inner and outer races 34 and 36, respectively. The ball bearing assembly 30 is mounted in a central boss portion 38 of a metal end housing plate 40 which is concentric with the shaft and housing 12 and rests on the inside surface of the housing 12. Shaft 23 is supported adjacent its other end 25 by a similar ball-bearing assembly 42 mounted in the end wall 44 which is integral with the housing 12.

Secured to shaft 23 is a bushing 46 of electrical insulation material such as "nylon" on which are secured a pair of slip rings 47, 48 of electrically conductive material such as copper electrically connected to respective terminals of the rotor winding 28. A brush holder member 50 of electrical insulation material rests on the inside surface of the housing adjacent to the end housing plate 40. Member 50 is concentric with the end plate 40 and has the same diameter. A pair of boss portions 52 and 53 of member 50 project axially into corresponding apertures in end plate 40 so that the end plate and member 40 are angularly locked together. Member 50 has a short radial projection 54 which projects into an axially extending slot 56 in housing 12 so that angular movement or rotation of end plate 40 and member 50 is prevented.

Member 50 mounts a pair of electrically conductive brushes 58 and 59 in electrical contact with slip rings 47 and 48, respectively. Brushes 58 and 59 are connected to an external circuit by means of respective insulated conductors 60 and 61 which pass respectively through the boss portions 52 and 53. The stator winding 20 is connected to an external circuit by means of insulated conductors 62 which pass through suitable apertures in end plate 40 and the brush holder 50.

Positioned concentrically on the inside surface of the housing and in abutment against the last stator core lamination is an axially crimped spring washer 64 composed of beryllium and copper. Sandwiched between spring washer 64 and the brush holder member 50 is a rigid spacer sleeve 66. The inside surface of the housing 12 is threaded to receive an externally threaded retaining ring 68 which maintains engagement with end plate 40 so as to retain firmly together the end plate, the brush holder 50, the sleeve 66 and the spring washer 64 in axial position inside the housing. The retaining ring 68 also serves to adjust the axial-play or end-play of the shaft assembly as will now be described.

Figure 3:
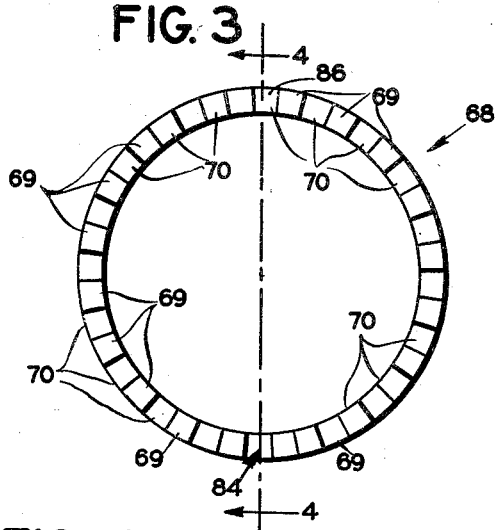
Fig. 3 is a plan view of the axial-play adjusting ring of Fig. 1 as seen from inside the housing with the split-ring locking member removed.
Figure 4:
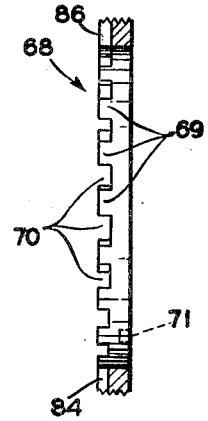
Fig. 4 is a cross-sectional side view of the axial-play adjusting ring taken along the line 4—4 of Fig. 3.
Figures 1A, 1B:
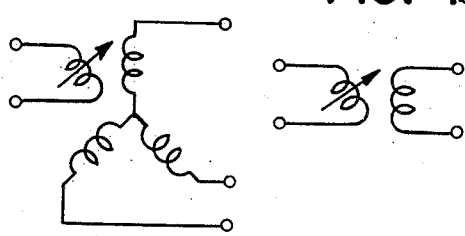
Figs. 1a and 1b are schematic diagrams respectively of a synchro device and a linear-output rotatable transformer.

As seen best in Figs. 3 and 4 the retaining ring 68 has a series of radial slots 70 equally spaced along its circumference on the side which engages the end housing plate 40. The slots may have a depth which is about half the thickness of the ring. To facilitate rotation of ring 68 by a cylindrical tool having radial projections, the outer end surface of ring 68 is provided with corresponding slots 69 to receive the tool projections.

It will be noted that two forms of axial-play occur in device 12. The principal axial-play or end-play of the shaft and shaft assembly occurs between the right-hand annular edge portion 72 of the bushing 46 fixed to shaft 23 and the left-hand annular edge of the inner race 34 of the ball-bearing assembly 30, and similarly there is the axial play between the left-hand annular edge portion of the enlarged integral shaft portion 74 and the right-hand edge portion of the inner race of the ball-bearing assembly 42. Also, there is some axial play between the right-hand edge portions of the inner and outer races 34 and 36 of assembly 30 and the inside wall of end plate 40, and similarly there is the axial play between the left-hand edge portions of the inner and outer races of bearing assembly 42 and the inside surface of the housing wall 44.

In a typical small synchro device for example, it may be desirable to adjust the retaining ring 68 so as to maintain an axial play range from ±0.0000 to 0.0010 inch during normal operation of the device. Clockwise rotation of ring 68 causes it to advance farther to the left, thereby correspondingly displacing the brush holder 50 and the sleeve 18 to the left which increases the compression of the crimped spring washer 64. It will be seen that displacement of end plate 40 to the left decreases the axial-play by decreasing the maximum clearance possible between the left-hand edge of inner race 34 and the shaft bushing 72 and also decreasing somewhat the axial-play between the races 34 and 36 and the end plate 40. Counter-clockwise rotation of ring 68 serves in a similar manner to increase the axial-play as the compression of spring washer 64 decreases. In order to prevent angular movement of ring 68 caused by vibration and handling once ring 68 has been adjusted, and hence to prevent axial movement of ring 68 which would otherwise permit an unwanted degree of axial play of the shaft and shaft assembly, means will now be described for locking the axial-play adjustment by locking the ring 68 in its adjusted angular position.

Figure 5:
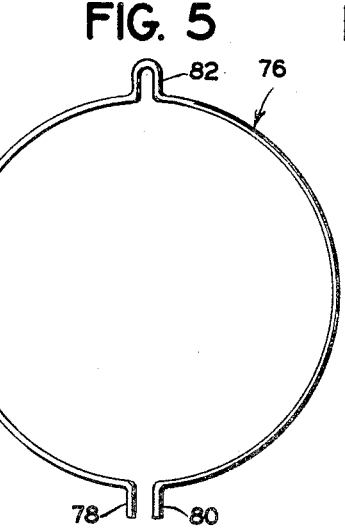
Figs. 5 and 6 are plan and side views, respectively, of the locking member of Fig. 1 in the form of a substantially closed split-ring.
Figure 6:

As shown best in Figs. 5 and 6 the locking means comprises a split-ring device indicated generally at 76. The split-ring is preferably composed of a resilient material such as tempered stainless steel spring wire having a diameter of 0.015 inch, although the split-ring may instead be made rigid if so desired. The two end portions 78 and 80 are bent radially outward in the plane of the split-ring, while a portion 82 midway between the ends is bent or crimped radially outward to form a hinge-like portion in the plane of the split-ring.

During the locking operation the assembler compresses the end portions 78 and 80 together and inserts them through the particular slot 84 in the retaining ring 68 which happens to be substantially aligned radially with the slot 56 in the housing. The ends 78 and 80 are then caused to project into the slot 56, and the intermediate folded portion 82 is then caused to project into the particular slot 86 in the retaining ring 68 which is diametrically opposite the slot 84. It will be noted that it is the end portions 78 and 80 of the split-ring which individually and collectively perform the basic locking function by each projecting from slot 84 of the retaining ring 68 into slot 56 of the housing, thereby angularly, and hence also axially, locking the retaining ring 68 relative to the housing 12. The remaining portions of the split ring including the anchored intermediate portion 82 serve to make it impossible for the ends 78 and 80 to move radially inward due to vibration or handling an amount sufficient to come out of the slot 56 in housing 12. To this end, the generally semi-circular portions of the split-ring should preferably be arranged to engage or almost engage the portions 69 of the retaining ring 68 along its inner circumference. As previously indicated, it is a feature of the locking means that the split-ring may be readily removed by hand.

Figure 7:
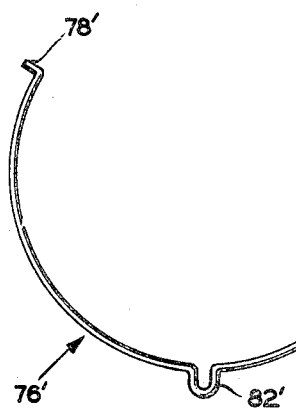
Figs. 7 and 8 are plan and side views, respectively, of a modified form of split-ring locking members.
Figure 8:
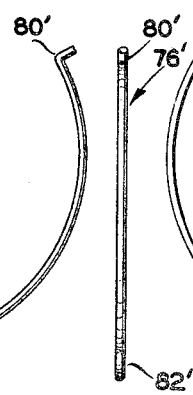

If desired, the open ends 78 and 80 of the split-ring may have a substantial initial separation when the split-ring is in its free unstressed condition prior to insertion in the instrument. For example, as shown in Figs. 7 and 8, the open ends 78' and 80' of split-ring 76' may have an initial separation of 120°. Device 76' may be employed to lock the adjustment of the retaining ring 68 as follows. The folded projecting portion 82' is first inserted through the particular slot 84 opposite slot 56 in the housing and portion 82' is caused to project into slot 56 thereby angularly, and hence also axially, locking the ring 68 to the housing 12. The end 78' is then inserted into one of the slots 70 in the ring 68 which is approximately 120° from slot 84 and the end 80' is inserted into another of the slots 70 which is approximately 120° from slot 84 measured in the opposite direction.

Figure 9:
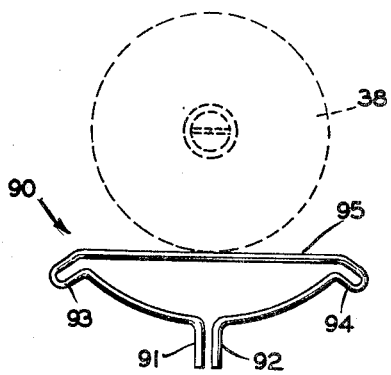
Figs. 9 and 10 are plan and side views, respectively, of another form of locking member.
Figure 10:
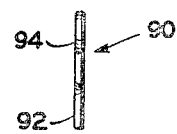

In the form shown in Figs. 9 and 10, the locking member 90 comprises a resilient wire having its open ends 91 and 92 bent outwardly in a manner similar to ends 78 and 80 of the split-ring 76. A pair of intermediate folded or crimped portions 93 and 94 are provided and connected by a straight relatively stiff portion 95, the entire device 90 lying in substantially one plane. The ends 91 and 92 are inserted through the particular slot 84 opposite slot 56 in the housing and the ends 91 and 92 are caused to project into slot 56 thereby angularly, and hence also axially, locking the ring 68 to the housing 12. The folded portion 93 is inserted in one of the slots 70 in the ring 68 spaced from slot 84 while the folded portion 94 is inserted in another of the slots 70 spaced from slot 84 on the other side, the straight portion 95 resting firmly against the undersurface of the boss portion 38 of end plate 40 as indicated by the dotted lines in Fig. 9.

Although specific forms of the invention have been illustrated and described in detail by way of example, it is to be expressly understood that the invention is not limited thereto. In its broad aspects the invention contemplates locking means, for example simply a straight element, which operatively extends from the axial-play adjusting means to the housing and further contemplates removable means for locking an axial-play adjusting means which is initially rotatable to accomplish the adjustment. Various changes may be made in the shape, size and design of the various elements without departing from the spirit and scope of the appended claims as will now be understood by those skilled in the art.

I claim:
1. A rotatable transformer device comprising a housing, a stator fixed with respect to said housing and including at least one stator winding within said housing, a rotor including at least one rotor winding, a rotatable shaft for rotatably supporting said rotor within said housing with said rotor winding in inductive coupling relation with said stator winding, said housing being open at one end and having at its other end a wall portion with a first bearing unit therein for supporting one end portion of said shaft, an end plate at said open end of the housing with a second bearing unit for supporting the other end portion of said shaft, a retaining ring threaded on said housing at the open end thereof adjacent said end plate so that angular movement of said ring produces axial movement of said ring and said end plate to adjust the end play of said shaft, said housing having a slot extending in an axial direction away from said open end of the housing, said ring having a series of slots spaced along the circumference thereof, and a removable locking member having a relatively rigid portion which is located partially in said slot in the housing and which extends into an adjacent one of said slots in said ring to prevent movement of said ring from its adjusted angular and axial position.

2. A device according to claim 1 wherein said locking member comprises a split-ring having its end portions bent outwardly and having an outwardly extending portion intermediate its end portions, the outermost part of each of said end portions of said split-ring being positioned in said slot in the housing and the innermost part of each of said end portions being positioned in said adjacent slot in the retaining ring, said intermediate portion projecting into another one of said slots in said retaining ring.

3. A device according to claim 1 wherein said end plate has a central boss portion which houses said second bearing unit and wherein said locking member comprises a split-ring having its end portions bent outwardly and having a pair of spaced outwardly extending portions intermediate its end portions, the outermost part of said end portions of said split-ring being positioned in said slot in the housing and the innermost part of said end portions being positioned in said adjacent slot in the retaining ring, said intermediate portions being positioned in a second and a third slot, respectively, of said retaining ring spaced on either side of said adjacent slot, part of the uninterrupted portion between said re-entrant portions being in engagement with said boss portion of the end plate.

4. A device according to claim 1 wherein said locking member comprises a split-ring having its end portions bent outwardly and having an outwardly extending portion intermediate its end portions, the outermost part of said intermediate portion being located in said slot in the housing and extending into said adjacent slot in the retaining ring, the ends of the split-ring being located in second and third slots, respectively, spaced from said adjacent slot.

5. A rotatable transformer device comprising a housing, a stator fixed with respect to said housing and including at least one stator winding within said housing, a rotor including at least one rotor winding, a rotatable shaft for rotatably supporting said rotor within said housing with said rotor winding in inductive coupling relation with said stator winding, said housing being open at one end and having at its other end a wall portion with a first bearing unit therein for supporting one end portion of said shaft, an end plate at said open end of the housing with a second bearing unit for supporting the other end portion of said shaft, said housing having a slot extending in an axial direction away from said open end of the housing, at least one slip-ring rotatably mounted on said shaft inside the housing, a brush of electrically conductive material, a brush-support member for holding said brush in electrical contact with said slip-ring, said member being positioned on the side of said end plate remote from the open end of said housing and having a portion disposed for axial movement in said slot in the housing, said end plate being adapted to move with said brush-support member, a retaining ring threaded on said housing at the open end thereof adjacent the other side of said end plate so that initial rotational adjustment of said retaining ring produces axial adjustment of said ring, of said end plate and of said brush-support member to adjust the end play permitted for said shaft, said retaining ring having a series of slots spaced along the circumference thereof, and a removable member for locking said initial end-play adjustment, said removable member comprising a split-ring device of resilient material lying substantially in one plane and having relatively stiff end portions bent outwardly and having an outwardly extending portion intermediate its end portions, the outermost part of each of said end portions of said split-ring device being positioned in said slot in the housing and the innermost part of each of said end portions being positioned in an adjacent one of said slots in the retaining ring to prevent movement of said retaining ring from its initially adjusted angular and axial position, the generally circular part of said split-ring device being located inside the inner circumference of said retaining ring and said intermediate portion of the split-ring device being positioned in another of said slots in the retaining ring to insure that the end portions of said split-ring device remain in said slot in the housing until it is desired to remove said split-ring device.

References Cited in the file of this patent

UNITED STATES PATENTS 2,571,810    Andresen _____ Oct. 16, 1951

FOREIGN PATENTS 677,806    Great Britain _____ Aug. 20, 1952